United States Patent
Wang (10) Patent No.: US 12,294,877 B2
(45) Date of Patent: May 6, 2025

(54) METHOD AND APPARATUS FOR DETERMINING TIME-DOMAIN POSITION OF SEARCH SPACE, AND COMMUNICATION DEVICE

(71) Applicant: DATANG MOBILE COMMUNICATIONS EQUIPMENT CO., LTD., Beijing (CN)

(72) Inventor: Lei Wang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 662 days.

(21) Appl. No.: 17/600,064

(22) PCT Filed: Mar. 24, 2020

(86) PCT No.: PCT/CN2020/080887
§ 371 (c)(1),
(2) Date: Sep. 29, 2021

(87) PCT Pub. No.: WO2020/199979
PCT Pub. Date: Oct. 8, 2020

(65) Prior Publication Data
US 2022/0191722 A1    Jun. 16, 2022

(30) Foreign Application Priority Data
Mar. 29, 2019 (CN) .......................... 201910250589.3

(51) Int. Cl.
*H04W 24/08* (2009.01)
*H04W 72/0446* (2023.01)
*H04W 72/51* (2023.01)

(52) U.S. Cl.
CPC ....... *H04W 24/08* (2013.01); *H04W 72/0446* (2013.01); *H04W 72/51* (2023.01)

(58) Field of Classification Search
None
See application file for complete search history.

(56) References Cited

U.S. PATENT DOCUMENTS 11,146,979 B2 * 10/2021 Hwang ............ H04W 52/0216
11,617,195 B2 * 3/2023 Huang .................. H04L 5/0048
370/329

(Continued)

FOREIGN PATENT DOCUMENTS

CN    103716274 A    4/2014
CN    108401526 A    8/2018

(Continued)

OTHER PUBLICATIONS

International Search Report from PCT/CN2020/080887, dated Jun. 30, 2020, with English translation from WIPO, all pages.

(Continued)

*Primary Examiner* — Phirin Sam
(74) *Attorney, Agent, or Firm* — Ladas & Parry, LLP (57) ABSTRACT

Provided are a method and an apparatus for determining a time-domain position of a search space, and a communication device. The method for determining the time-domain position of the search space includes: determining the time-domain position of the search space corresponding to a terminal, according to terminal parameter information and a search space monitoring periodicity of the terminal. The terminal parameter information includes: a terminal identity identifier (UE ID) or a cell radio network temporary identifier (C-RNTI) corresponding to the terminal; and the search space monitoring periodicity of the terminal is a predetermined value.

16 Claims, 2 Drawing Sheets

(56) References Cited

U.S. PATENT DOCUMENTS

| | | | |
|---|---|---|---|
| 11,917,621 B2* | 2/2024 | Zhang | H04L 5/0053 |
| 12,041,662 B2* | 7/2024 | Ko | H04W 74/0833 |
| 2015/0237604 A1 | 8/2015 | Shi et al. | |
| 2019/0141546 A1* | 5/2019 | Zhou | H04B 7/0626 |
| 2020/0178284 A1* | 6/2020 | Chen | H04L 1/08 |
| 2020/0211290 A1* | 7/2020 | Choi | G06V 20/582 |
| 2020/0313833 A1* | 10/2020 | Yi | H04L 5/001 |
| 2020/0344034 A1 | 10/2020 | Moon et al. | |
| 2020/0366560 A1 | 11/2020 | Liu | |
| 2021/0314938 A1* | 10/2021 | Kim | H04L 5/001 |
| 2022/0015153 A1* | 1/2022 | He | H04W 74/0833 |
| 2022/0124820 A1* | 4/2022 | Ko | H04W 56/0045 |
| 2022/0141877 A1* | 5/2022 | Ko | H04W 74/0833 370/329 |
| 2022/0353940 A1* | 11/2022 | Cirik | H04B 7/088 |
| 2023/0046087 A1* | 2/2023 | Ahmad | H04W 52/0209 |

FOREIGN PATENT DOCUMENTS

| | | |
|---|---|---|
| WO | 2018/204886 | 11/2018 |
| WO | 2018/230965 A2 | 12/2018 |

OTHER PUBLICATIONS

Written Opinion of the International Searching Authority from PCT/CN2020/080887, dated Jun. 30, 2020, with English translation from WIPO, all pages.

International Preliminary Report on Patentability from PCT/CN2020/080887, dated Sep. 28, 2021, with English translation from WIPO, all pages.

Extended European Search Report issued for EP 20785060.3 mailed on Apr. 12, 2022.

3GPP TSG RAN WG1 #90 Prague P.R. Czechia, Aug. 21-25, 2017, R-1712569, Intel Corporation, "PDCCH Search Spaces and Monitoring," entire document.

First Korean Office Action for the corresponding Korean Patent Application No. 10-2021-7032832 issued by the Korean Patent Office on Nov. 10, 2023, and its English translation provided by the foreign associate.

"Search Space Design for MTC," 3GPP TSG-RAN WG1 Meeting #83 R1-156639, Anaheim, USA, Nov. 15-22, 2015, Agenda item: 6.2.1.3, Source: Nokia Networks, all pages.

* cited by examiner

Fig. 1 determining, according to terminal parameter information and a search space monitoring periodicity of a terminal, the time-domain position of the search space corresponding to the terminal; where the terminal parameter information includes: a terminal identity identifier (UE ID) or a cell radio network temporary identifier (C-RNTI) corresponding to the terminal, and the search space monitoring periodicity of the terminal is a predetermined value

METHOD AND APPARATUS FOR DETERMINING TIME-DOMAIN POSITION OF SEARCH SPACE, AND COMMUNICATION DEVICE

CROSS-REFERENCE TO RELATED APPLICATIONS

This application is the U.S. national phase of PCT Application No. PCT/CN2020/080887 filed on Mar. 24, 2020, which claims a priority of Chinese patent application No. 201910250589.3 filed on Mar. 29, 2019, the disclosures of which are incorporated herein by reference in their entireties.

TECHNICAL FIELD

The present disclosure relates to the field of communications technologies, and in particular, to a method and an apparatus for determining a time-domain position of a search space, and a communication device.

BACKGROUND

In the related art, a time-domain position of a search space in a mobile communication system is determined by protocol predefinition (that is, a terminal need perform blind detection in each subframe) or configured through a radio resource control (RRC) signaling (configuring different periods and offsets for respective search spaces). When a periodicity of a search space is large and different periods are not required, configuration through RRC may cause additional signaling overhead.

Figure 1:
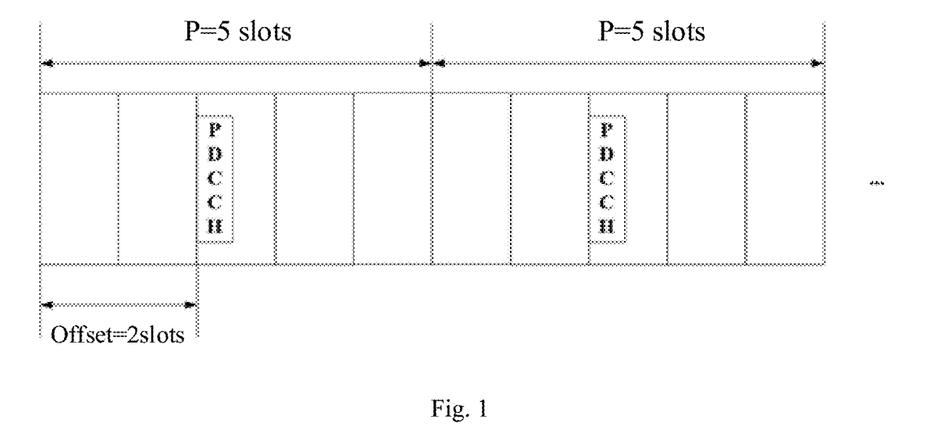
FIG. 1 is a schematic diagram of a slot-level offset configured for a search space in a periodicity in the related art.

Specifically, in a 5G system, RRC signaling can be used to flexibly configure different monitoring periods for search spaces, such as slot-level (slot level) monitoring periods and symbol-level (symbol level) monitoring periods, and the search space can be configured with a slot-level offset within the period. As shown in FIG. 1, the monitoring periodicity P=5 slots and Offset=2 slots.

In a satellite communication system, a carrier spacing is 120 kHz, so 8 slots may be included in a time range of 1 ms. Considering that service types in the satellite system are relatively simple, and a propagation delay is relatively long, the search space does not require a monitoring periodicity per slot (every slot). However, if USSs (UE-specific search spaces) of all terminals adopt a fixed monitoring periodicity and monitoring positions are the same, a probability of blocking (blocking) will be increased. Furthermore, if a search space configuration method in the 5G system is used, the RRC signaling overhead will be increased.

It can be seen from the above that the solution in the related art for determining a time-domain position of a search space may increase the signaling overhead or may be not flexible enough.

SUMMARY

The present disclosure is to provide a method and an apparatus for determining a time-domain position of a search space, and a communication device, so as to solve the problem of increased signaling overhead or insufficient flexibility in the solution in the related art for determining a time-domain position of a search space.

In order to solve the above technical problem, embodiments of the present disclosure provide a method for determining a time-domain position of a search space, applied to a communication device. The method includes: determining, according to terminal parameter information and a search space monitoring periodicity of a terminal, the time-domain position of the search space corresponding to the terminal; where the terminal parameter information includes: a terminal identity identifier (UE ID) or a cell radio network temporary identifier (C-RNTI) corresponding to the terminal, and the search space monitoring periodicity of the terminal is a predetermined value.

Optionally, the determining, according to the terminal parameter information and the search space monitoring periodicity of the terminal, the time-domain position of the search space corresponding to the terminal includes: determining, according to the terminal parameter information and the search space monitoring periodicity of the terminal, an index of a time-domain resource of the search space corresponding to the terminal.

Optionally, the determining, according to the terminal parameter information and the search space monitoring periodicity of the terminal, the index of the time-domain resource of the search space corresponding to the terminal, includes:
determining, according to the terminal parameter information and the search space monitoring periodicity of the terminal, the index of the time-domain resource of the search space corresponding to the terminal by using a first formula; where, the first formula is: $\mathrm{mod}(T_{index}, N)=\mathrm{mod}(A, N)$; mod represents a modulus operator, $T_{index}$ represents the index of the time-domain resource of the search space, N represents the search space monitoring periodicity of the terminal, N is a positive integer greater than or equal to 1, and A represents the terminal parameter information.

Optionally, the index of the time-domain resource of the search space includes at least one of: an index of slot, an index of subframe, or an index of radio subframe.

Optionally, the index of the time-domain resource of the search space is a relative time serial number or an absolute time serial number.

Optionally, the relative time serial number is a serial number within a preset time period.

Optionally, the absolute time serial number is a serial number within a system.

Optionally, a numbering manner of the terminal parameter information is consistent with a numbering manner of the index of the time-domain resource of the search space.

Optionally, before determining, according to the terminal parameter information and the search space monitoring periodicity of the terminal, the time-domain position of the search space corresponding to the terminal, the method further includes: determining the search space monitoring periodicity of the terminal according to a preset parameter of the terminal; where the preset parameter of the terminal includes at least one of: a type of the terminal, a type of a service supported by the terminal, or a terminal capability of the terminal.

Optionally, the search space monitoring periodicity of the terminal is configured through a network or predefined through a protocol.

Embodiments of the present disclosure further provide a communication device, including: a memory, a processor, and a computer program stored on the memory and executable on the processor, where when executing the program, the processor is configured to implement following steps: determining, according to terminal parameter information and a search space monitoring periodicity of a terminal, a time-domain position of a search space corresponding to the terminal; where the terminal parameter information includes: a terminal identity identifier (UE ID) or a cell radio network temporary identifier (C-RNTI) corresponding to the terminal, and the search space monitoring periodicity of the terminal is a predetermined value.

Optionally, the processor is specifically configured to: determine, according to the terminal parameter information and the search space monitoring periodicity of the terminal, an index of a time-domain resource of the search space corresponding to the terminal.

Optionally, the processor is specifically configured to: determine, according to the terminal parameter information and the search space monitoring periodicity of the terminal, the index of the time-domain resource of the search space corresponding to the terminal by using a first formula; where, the first formula is: $\mod(T_{index}, N) = \mod(A, N)$; mod represents a modulus operator, $T_{index}$ represents the index of the time-domain resource of the search space, N represents the search space monitoring periodicity of the terminal, N is a positive integer greater than or equal to 1, and A represents the terminal parameter information.

Optionally, the index of the time-domain resource of the search space includes at least one of: an index of slot, an index of subframe, or an index of radio subframe.

Optionally, the index of the time-domain resource of the search space is a relative time serial number or an absolute time serial number.

Optionally, the relative time serial number is a serial number within a preset time period.

Optionally, the absolute time serial number is a serial number within a system.

Optionally, a numbering manner of the terminal parameter information is consistent with a numbering manner of the index of the time-domain resource of the search space.

Optionally, the processor is further configured to: determine the search space monitoring periodicity of the terminal according to a preset parameter of the terminal, before determining, according to the terminal parameter information and the search space monitoring periodicity of the terminal, the time-domain position of the search space corresponding to the terminal; where the preset parameter of the terminal includes at least one of: a type of the terminal, a type of a service supported by the terminal, or a terminal capability of the terminal.

Optionally, the search space monitoring periodicity of the terminal is configured through a network or predefined through a protocol.

Embodiments of the present disclosure further provide a computer readable storage medium, where a computer program is stored in the computer readable storage medium, and the program, when executed, causes a processor to implement steps of the above method for determining the time-domain position of the search space.

Embodiments of the present disclosure further provide an apparatus for determining a time-domain position of a search space, applied to a communication device. The apparatus includes a first determining module, configured to determine, according to terminal parameter information and a search space monitoring periodicity of a terminal, a time-domain position of a search space corresponding to the terminal; where the terminal parameter information includes: a terminal identity identifier (UE ID) or a cell radio network temporary identifier (C-RNTI) corresponding to the terminal, and the search space monitoring periodicity of the terminal is a predetermined value.

Optionally, the first determining module includes: a first determining submodule, configured to determine, according to the terminal parameter information and the search space monitoring periodicity of the terminal, an index of a time-domain resource of the search space corresponding to the terminal.

Optionally, the first determining submodule includes: a determining unit, configured to determine, according to the terminal parameter information and the search space monitoring periodicity of the terminal, the index of the time-domain resource of the search space corresponding to the terminal by using a first formula; where, the first formula is: $\mod(T_{index}, N) = \mod(A, N)$; mod represents a modulus operator, $T_{index}$ represents the index of the time-domain resource of the search space, N represents the search space monitoring periodicity of the terminal, N is a positive integer greater than or equal to 1, and A represents the terminal parameter information.

Optionally, the index of the time-domain resource of the search space includes at least one of: an index of slot, an index of subframe, or an index of radio subframe.

Optionally, the index of the time-domain resource of the search space is a relative time serial number or an absolute time serial number.

Optionally, the relative time serial number is a serial number within a preset time period.

Optionally, the absolute time serial number is a serial number within a system.

Optionally, a numbering manner of the terminal parameter information is consistent with a numbering manner of the index of the time-domain resource of the search space.

Optionally, the apparatus further includes: a second determining module, configured to determine the search space monitoring periodicity of the terminal according to a preset parameter of the terminal; where the preset parameter of the terminal includes at least one of: a type of the terminal, a type of a service supported by the terminal, or a terminal capability of the terminal.

Optionally, the search space monitoring periodicity of the terminal is configured through a network or predefined through a protocol.

The beneficial effects of the above technical solutions of the present disclosure are as follows.

Based on the method for determining time-domain position of the search space in the above solutions, a time-domain position of a search space corresponding to a terminal is determined according to terminal parameter information and a search space monitoring periodicity of the terminal; where the terminal parameter information includes: a terminal identity identifier (UE ID) or a cell radio network temporary identifier (C-RNTI) corresponding to the terminal; and the search space monitoring periodicity of the terminal is a predetermined value, which can achieve implicit determination of time-domain position of the search space. Configuration through RRC signaling or the terminal side performing blind detection in each subframe is no longer required, which reduces the RRC signaling overhead, while ensuring flexibility and reducing complexity of the terminal side. Thus, the problem of increased signaling overhead or insufficient flexibility in the solution in the related art for determining a time-domain position of a search space is well solved.

BRIEF DESCRIPTION OF THE DRAWINGS

In order to illustrate the technical solutions of the embodiments of the present disclosure in a clearer manner, the drawings for describing the embodiments of the present disclosure will be described hereinafter briefly. Obviously, the following drawings merely relate to some embodiments of the present disclosure, and based on these drawings, a person skilled in the art may obtain the other drawings without creative effort.

DETAILED DESCRIPTION

In order to make a technical problem to be solved, technical solutions, and advantages of the present disclosure clearer, a detailed description will be given below in conjunction with the accompanying drawings and specific embodiments.

Figure 2:
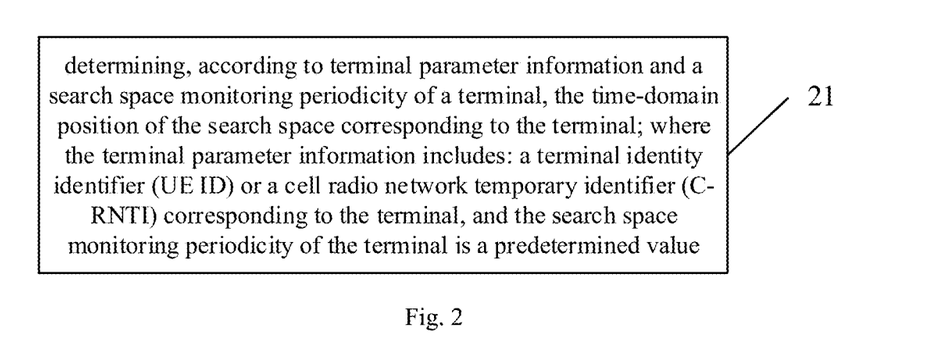
FIG. 2 is a schematic diagram of a method for determining a time-domain position of a search space according to an embodiment of the present disclosure.

In view of the problem of increased signaling overhead or insufficient flexibility in a solution in the related art for determining a time-domain position of a search space, the present disclosure provides a method for determining a time-domain position of a search space applied to a communication device, which, as shown in FIG. 2, includes:

step 21: determining, according to terminal parameter information and a search space monitoring periodicity of a terminal, the time-domain position of the search space corresponding to the terminal; where the terminal parameter information includes: a terminal identity identifier (UE ID) or a cell radio network temporary identifier (C-RNTI) corresponding to the terminal, and the search space monitoring periodicity of the terminal is a predetermined value.

The communication device may be a terminal or a network-side device. This solution includes a solution for determining a time-domain monitoring position of a search space on a terminal side or a solution for determining a time-domain transmission position of a search space on a network side, which is not limited herein.

Based on the method for determining time-domain position of the search space provided in the embodiments of the present disclosure, a time-domain position of a search space corresponding to a terminal is determined according to terminal parameter information and a search space monitoring periodicity of the terminal; where the terminal parameter information includes: a terminal identity identifier (UE ID) or a cell radio network temporary identifier (C-RNTI) corresponding to the terminal; and the search space monitoring periodicity of the terminal is a predetermined value, which can achieve implicit determination of time-domain position of the search space. Configuration through RRC signaling or the terminal side performing blind detection in each subframe is no longer required, which reduces the RRC signaling overhead, while ensuring flexibility and reducing complexity of the terminal side. Thus, the problem of increased signaling overhead or insufficient flexibility in the solution in the related art for determining a time-domain position of a search space is well solved.

The determining, according to the terminal parameter information and the search space monitoring periodicity of the terminal, the time-domain position of the search space corresponding to the terminal includes: determining, according to the terminal parameter information and the search space monitoring periodicity of the terminal, an index of a time-domain resource of the search space corresponding to the terminal.

Specifically, the determining, according to the terminal parameter information and the search space monitoring periodicity of the terminal, the index of the time-domain resource of the search space corresponding to the terminal, includes: determining, according to the terminal parameter information and the search space monitoring periodicity of a terminal, the index of the time-domain resource of the search space corresponding to the terminal by using a first formula; where, the first formula is: $\mod(T_{index}, N)=\mod(A, N)$; mod represents a modulus operator, $T_{index}$ represents the index of the time-domain resource of the search space, N represents the search space monitoring periodicity of the terminal, N is a positive integer greater than or equal to 1, and A represents the terminal parameter information.

In embodiments of the present disclosure, the index of the time-domain resource of the search space includes at least one of: an index of slot, an index of subframe, or an index of radio subframe.

The index of the time-domain resource of the search space is a relative time serial number or an absolute time serial number.

Specifically, the relative time serial number may be a serial number within a preset time period. The absolute time serial number may be a serial number within a system.

In embodiments of the present disclosure, a numbering manner of the terminal parameter information is consistent with a numbering manner of the index of the time-domain resource of the search space, for example, starting numbers and numbers of intermediate interval numbers are the same, which are not limited herein.

Further, before determining, according to the terminal parameter information and the search space monitoring periodicity of the terminal, the time-domain position of the search space corresponding to the terminal, the method further includes: determining the search space monitoring periodicity of the terminal according to a preset parameter of the terminal; where the preset parameter of the terminal includes at least one of: a type of the terminal, a type of a service supported by the terminal, or a terminal capability of the terminal.

The type can be a type of a working area, that is, the type is classified according to the working area of the terminal (such as air, ground, sea, etc.), but it is not limited to this.

The search space monitoring periodicity of the terminal is configured through a network or predefined through a protocol. The pre-defining through a protocol may be understood as an agreement between or among the network, the terminal and other parties through the protocol, where each of the related parties knows the relevant information.

The method for determining the time-domain position of the search space provided by the embodiments of the present disclosure will be further described below, and an example is given that the communication device is a terminal.

In view of the above technical problem, embodiments of the present disclosure provide a method for determining a time-domain position of a search space, which involves: all terminals monitor search spaces at a fixed period; the time-domain position of the search space of the terminal is implicitly determined according to the terminal ID or the cell radio network temporary identifier (C-RNTI) corresponding to the terminal.

Specifically:

1. The search space monitoring periodicity of the terminal is fixed and is N slots. The specific time-domain position for (monitoring or sending) the search space is determined by the UE ID (or the C-RNTI corresponding to the terminal) and the monitoring periodicity N, where N is a positive integer greater than or equal to 1. An example is given below that the specific time domain location where the terminal monitors the search space is determined based on the UE ID and N.

Assuming that the monitoring periodicity of the terminal is N time-domain resources, and ID of the terminal is the UE ID, the terminal needs to monitor a downlink control channel (i.e., a search space) on a time-domain resource T with an index, where the index satisfies a formula: $\mod(T_{index}, N) = \mod(A, N)$;

where, the T may be a slot, or other time-domain resource units such as subframe and radio frame, and the index of the time-domain resource T is a relative time serial number or an absolute time serial number.

(1) The relative time serial number is a serial number within a preset time period, such as a number of a slot within 1 ms, or a number of a subframe within a radio frame.

(2) The absolute time serial number is a time serial number in a system. For example, when the resource is a slot, the absolute time serial number of the slot is determined according to a mutual inclusion relationship of numbers of radio frame and/or subframe in which the resource is located. For example, one radio frame contains R subframes, and one subframe contains S slots. Assuming that a number of a radio frame is p, a number of a subframe in the radio frame is r, and a number of a slot in the subframe is m, then the above formula uses $T_{index} = p \times R \times S + r \times S + m$. The calculation of the absolute time serial number of the subframe is similar to that of the slot, and it is not repeated herein.

It is assumed that radio frame, subframe, and slot are numbered starting from 0, but it is not limited to this.

2. Search space monitoring periods of different types of terminals are different (can be preset), such as:

(1) the different types of terminals can be distinguished according to a working area of the terminal, for example, air terminals (such as 8 slots), ground terminals (such as 4 slots), maritime terminals (such as 10 slots), etc.;

(2) the different types of terminals can be distinguished according to types of services supported by the terminals, for example, terminals that only support data services, terminals that only support voice services, and terminals that support different types of services;

(3) the different types of terminals can be distinguished according to terminal capabilities reported by the terminals.

It is explained herein that the network side can determine a time-domain position for transmitting the search space in the same manner as the terminal side, and details are not described herein again.

The solutions provided in the embodiments of the present disclosure are illustrated below with examples.

Example 1: in a satellite communication system, assuming that monitoring periods of USSs of UE#1, UE#2, UE#3, and UE#4 are all N slots. In this example, assuming that N=8 and UE#1 to 4 have different UE IDs, and assuming that the UE IDs thereof are 0, 1, 2, and 3 respectively, the corresponding USSs are respectively represented as USS#1, USS#2, USS#3, USS#4; the absolute serial number of the time domain monitoring slot in the system of US S#1 to 4 shall meet the following conditions:

the monitoring slot of USS#1: mod(slot index,8)=mod(0, 8), that is, slots 0, 8, 16, 32 . . . ;
the monitoring slot of USS#2: mod(slot index,8)=mod(1, 8), that is, slots 1, 9, 17, 33 . . . ;
the monitoring slot of USS#3: mod(slot index,8)=mod(2, 8), that is, slots 2, 10, 18, 34 . . . ; and
the monitoring slot of USS#4: mod(slot index,8)=mod(3, 8), that is, slots 3, 11, 19, 35 . . . .

Correspondingly, the network side sends the downlink control channel for UE#1 only on slots 0, 8, 16, 32 . . . , etc., the network side sends the downlink control channel for UE#2 only on slots 1, 9, 17, 33 . . . etc., the network side sends the downlink control channel for UE#3 only on slots 2, 10, 18, 34, etc., and the network side sends the downlink control channel for UE#4 only on slots 3, 11, 19, 35 . . . etc. Correspondingly, the terminal also tries to detect and receive its own physical downlink control channel (PDCCH) on the corresponding slots described above.

When calculating the absolute time serial number of the slot, it needs to be determined according to the mutual inclusion relationship among the radio frame, subframe, and slot, which depends on a frame structure design of a system. For example, one radio frame contains R subframes, and one subframe contains S slots. Assuming that a number of a radio frame is p, a number of a subframe in the radio frame is r, and a number of a slot in the subframe is m, then the above formula uses $T_{index} = p \times R \times S + r \times S + m$. The calculation of the absolute time serial number of the subframe is similar to this. It is assumed herein that radio frame, subframe, and slot are numbered starting from 0.

Example 2: As described in Example 1, assuming that there are 8 slots within 1 ms (that is, the monitoring periodicity N=8), and the index of slot used when calculating the USS monitoring position is the relative time serial number within 1 ms. At this time, the number range of the slot is 0, 1, 2, 3, 4, 5, 6, 7; based on this assumption, the number of the time domain monitoring slot of USS#1~4 in each subframe should meet the following conditions:

the monitoring slot of USS#1: mod(slot index,8)=mod(0, 8), that is, slot 0;
the monitoring slot of USS#2: mod(slot index,8)=mod(1, 8), that is, slot 1;
the monitoring slot of USS#3: mod(slot index,8)=mod(2, 8), that is, slot 2; and
the monitoring slot of USS#1: mod(slot index,8)=mod(3, 8), that is, slot 3.

Example 3: USS search space periods N of different types of terminals are different. The different types of terminals are determined at least according to the following rules.

The different types of terminals may be distinguished according to the working area of the terminal, such as air terminals, ground terminals, and maritime terminals. Specifically, a search space monitoring periodicity of an air terminal is N1, a monitoring periodicity of a ground terminal is N2, and a monitoring periodicity of a maritime terminal is N3, see the following table.

The different types of terminals may be distinguished according to types of services supported by the terminals, for example, terminals that only support data services, terminals that only support voice services, and terminals that support different types of services. Specifically, a search space monitoring periodicity of a terminal that supports a voice service is N1, and a monitoring periodicity of a terminal that does not support any voice service and only supports an Internet service is N2, see the following table.

The different types of terminals may be distinguished according to terminal capabilities reported by the terminals.

Specifically, the search space monitoring periodicity is matched according to the capability reported by the terminal, see the following table.

| Type of terminal | Search space monitoring period |
|---|---|
| Type 1 | N1 |
| Type 2 | N2 |
| Type 3 | N3 |
| ... | ... |

Example 4: the methods described in above Example 1 and Example 3 (or Example 2 and Example 3) can be combined as an implementation, that is, the search space monitoring periodicity is first determined according to the terminal type, and then an actual time-domain position for monitoring the search space is determined according to the method described in Example 1 or Example 2.

Example 5: as described in Examples 1 to 4, the methods are preferably applied to USS; however, the above methods can also be applied to a common search space (CSS), which is not limited herein.

It can be seen from the above embodiments that with the solution provided by the embodiments of the present disclosure, the actual time-domain position for monitoring the search space can be implicitly determined through the index of T, without directly indicating the actual time-domain monitoring position of the search space through signaling, or the terminal side performing blind detection in each subframe, which can reduce RRC signaling overhead while ensuring flexibility and reducing complexity of the terminal side.

Figure 3:
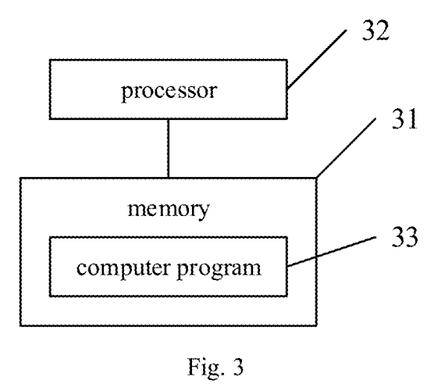
FIG. 3 is a schematic structural diagram of a communication device according to an embodiment of the disclosure.

Embodiments of the present disclosure further provide a communication device as shown in FIG. 3, including: a memory 31, a processor 32, and a computer program 33 stored on the memory 31 and executable on the processor 32. When executing the program, the processor 32 is configured to implement the following steps: determining, according to terminal parameter information and a search space monitoring periodicity of a terminal, a time-domain position of a search space corresponding to the terminal; where the terminal parameter information includes: a terminal identity identifier (UE ID) or a cell radio network temporary identifier (C-RNTI) corresponding to the terminal; the search space monitoring periodicity of the terminal is a predetermined value.

The communication device in the embodiments of the present disclosure may also include a transceiver with functions such as receiving and transmitting, which is not limited herein.

The communication device provided by the embodiments of the present disclosure determines a time-domain position of a search space corresponding to a terminal according to terminal parameter information and a search space monitoring periodicity of the terminal; where the terminal parameter information includes: a terminal identity identifier (UE ID) or a cell radio network temporary identifier (C-RNTI) corresponding to the terminal, and the search space monitoring periodicity of the terminal is a predetermined value; so that the time-domain position of the search space can be implicitly determined, and configuration through RRC signaling or the terminal side performing blind detection in each subframe is no longer required, which reduces the RRC signaling overhead, while ensuring flexibility and reducing complexity of the terminal side. Thus, the problem of increased signaling overhead or insufficient flexibility in the solution in the related art for determining a time-domain position of a search space is solved.

The processor is specifically configured to: determine, according to the terminal parameter information and the search space monitoring periodicity of the terminal, an index of a time-domain resource of the search space corresponding to the terminal.

Specifically, the processor is further configured to determine, according to the terminal parameter information and the search space monitoring periodicity of the terminal, the index of the time-domain resource of the search space corresponding to the terminal by using a first formula; where, the first formula is: $\mathrm{mod}(T_{index}, N) = \mathrm{mod}(A, N)$; mod represents a modulus operator, $T_{index}$ represents the index of the time-domain resource of the search space, N represents the search space monitoring periodicity of the terminal, N is a positive integer greater than or equal to 1, and A represents the terminal parameter information.

In embodiments of the present disclosure, the index of the time-domain resource of the search space includes at least one of: an index of slot, an index of subframe, or an index of radio subframe.

The index of the time-domain resource of the search space is a relative time serial number or an absolute time serial number.

Specifically, the relative time serial number may be a serial number within a preset time period. The absolute time serial number may be a serial number within a system.

In the embodiments of the present disclosure, a numbering manner of the terminal parameter information is consistent with a numbering manner of the index of the time-domain resource of the search space.

Specifically, the processor is further configured to: determine the search space monitoring periodicity of the terminal according to a preset parameter of the terminal; where the preset parameter of the terminal includes at least one of: a type of the terminal, a type of a service supported by the terminal, or a terminal capability of the terminal, before determining, according to the terminal parameter information and the search space monitoring periodicity of the terminal, the time-domain position of the search space corresponding to the terminal.

The search space monitoring periodicity of the terminal is configured through a network or predefined through a protocol.

The implementation embodiments of the above-mentioned method for determining the time-domain position of the search space are all applicable to the embodiments of the communication device, and the same technical effect can also be achieved.

Embodiments of the present disclosure further provide a computer readable storage medium, where a computer program is stored in the computer readable storage medium, when the program is executed by a processor, steps of the method for determining the time-domain position of the search space are implemented.

The implementation embodiments of the above-mentioned method for determining the time-domain position of the search space are all applicable to the embodiments of the computer readable storage medium, and the same technical effect can also be achieved.

Figure 4:
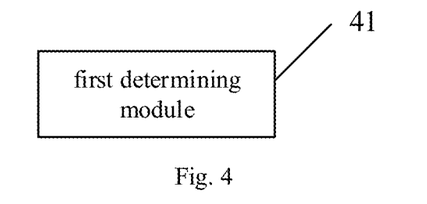
FIG. 4 is a schematic structural diagram of an apparatus for determining a time-domain position of a search space according to an embodiment of the present disclosure.

Embodiments of the present disclosure further provide an apparatus for determining a time-domain position of a search space, applied to a communication device. As shown in FIG. 4, the apparatus includes: a first determining module 41, configured to determine, according to terminal parameter information and a search space monitoring periodicity of a terminal, a time-domain position of a search space corresponding to the terminal; where the terminal parameter information includes: a terminal identity identifier (UE ID) or a cell radio network temporary identifier (C-RNTI) corresponding to the terminal, and the search space monitoring periodicity of the terminal is a predetermined value.

The apparatus for determining the time-domain position of the search space according to the embodiments of the present disclosure determines the time-domain position of the search space corresponding to the terminal, according to terminal parameter information and a search space monitoring periodicity of the terminal; where the terminal parameter information includes: a terminal identity identifier (UE ID) or a cell radio network temporary identifier (C-RNTI) corresponding to the terminal, and the search space monitoring periodicity of the terminal is a predetermined value; so that the time-domain position of the search space can be implicitly determined, and configuration through RRC signaling or the terminal side performing blind detection in each subframe is no longer required, which reduces the RRC signaling overhead, while ensuring flexibility and reducing complexity of the terminal side. Thus, the problem of increased signaling overhead or insufficient flexibility in the solution in the related art for determining a time-domain position of a search space is well solved.

The first determining module includes a first determining submodule, configured to determine, according to the terminal parameter information and the search space monitoring periodicity of the terminal, an index of a time-domain resource of the search space corresponding to the terminal.

Specifically, the determining submodule includes a first determining unit configured to determine, according to the terminal parameter information and the search space monitoring periodicity of the terminal, the index of the time-domain resource of the search space corresponding to the terminal by using a first formula; where, the first formula is: mod($T_{index}$, N)=mod(A, N); mod represents a modulus operator, $T_{index}$ represents the index of the time-domain resource of the search space, N represents the search space monitoring periodicity of the terminal, N is a positive integer greater than or equal to 1, and A represents the terminal parameter information.

In the embodiments of the present disclosure, the index of the time-domain resource of the search space includes at least one of: an index of slot, an index of subframe, or an index of radio subframe.

The index of the time-domain resource of the search space is a relative time serial number or an absolute time serial number.

Specifically, the relative time serial number may be a serial number within a preset time period. The absolute time serial number may be a serial number within a system.

In embodiments of the present disclosure, a numbering manner of the terminal parameter information is consistent with a numbering manner of the index of the time-domain resource of the search space.

Further, the apparatus for determining the time-domain position of the search space further includes a second determining module, configured to determine the search space monitoring periodicity of the terminal according to a preset parameter of the terminal; where the preset parameter of the terminal includes at least one of: a type of the terminal, a type of a service supported by the terminal, or a terminal capability of the terminal, before determining, according to the terminal parameter information and the search space monitoring periodicity of the terminal, the time-domain position of the search space corresponding to the terminal.

The search space monitoring periodicity of the terminal is configured through a network or predefined through a protocol.

The implementation embodiments of the above-mentioned method for determining the time-domain position of the search space are all applicable to the embodiments of the apparatus for determining the time-domain position of the search space, and the same technical effect can also be achieved.

It should be noted that many of functional components described in this specification are referred to as modules/submodules/units, so as to emphasize independence of their implementation more particularly.

In the embodiments of the present disclosure, the modules/submodules/units may be implemented in software, so as to be executed by various types of processors. For example, an identified executable code module may include one or more physical or logical blocks of computer instructions, which, for example, may be constructed as objects, procedures, or functions. Nevertheless, executable codes of an identified module do not need to be physically located together, and may include different instructions stored in different locations. When these instructions are logically combined together, they constitute a module and achieve a specified purpose of the module.

In fact, the executable code module may be a single instruction or many instructions, and may even be distributed on multiple different code segments, which may be among different programs, or distributed across multiple memory devices. Likewise, operational data can be identified within the module, and can be implemented in any appropriate form and organized within any suitable type of data structure. The operation data may be collected as a single data set, or may be distributed in different locations (including on different storage devices), and may exist, at least in part, only as an electronic signal on a system or network.

When the module is implemented by software, considering process level in related art, the module implemented in software may alternately implemented by a person skilled in the art building a corresponding hardware circuit to achieve corresponding functions, when not considering the cost. The hardware circuit includes a conventional Very Large Scale Integration (VLSI) circuit or a gate array and related semiconductors such as logic chips, transistors or other discrete elements. The module may also be implemented with programmable hardware devices, such as field programmable gate arrays, programmable array logic, programmable logic devices, and so on.

It should be appreciated that, the embodiments of the present disclosure may be implemented by hardware, software, firmware, middleware, microcode or a combination thereof. For hardware implementation, the units, modules, sub-units or sub-modules may be implemented in one or more Application Specific Integrated Circuits (Application Specific Integrated Circuits, ASIC), a Digital Signal Processor (Digital Signal Processing, DSP), a Digital Signal Processing Device (DSP Device, DSPD), a Programmable Logic Device (Programmable Logic Device, PLD), a Field-Programmable Gate Array (Field-Programmable Gate Array, FPGA), a general-purpose processor, a controller, a microcontroller, a microprocessor, another electronic unit for performing the functions described in this application, or a combination thereof.

For software implementation, the technology described herein may be implemented by modules (for example, procedures and functions) of the functions described herein. The software code may be stored in the memory and executed by the processor. The memory may be implemented inside or outside the processor.

The foregoing descriptions are merely optional implementations of the present disclosure. It should be noted that a person of ordinary skill in the art may make several improvements or polishments without departing from the principle of the present disclosure, and the improvements and polishments shall fall within the protection scope of the present disclosure.

What is claimed is:

1. A method for determining a time-domain position of a search space, applied to a communication device, comprising:
    determining the time-domain position of the search space corresponding to a terminal, according to terminal parameter information and a search space monitoring periodicity of the terminal;
    wherein the terminal parameter information comprises: a terminal identity identifier (UE ID) or a cell radio network temporary identifier (C-RNTI) corresponding to the terminal, and the search space monitoring periodicity of the terminal is a predetermined value;
    wherein, the determining the time-domain position of the search space corresponding to the terminal, according to the terminal parameter information and the search space monitoring periodicity of the terminal comprises:
    determining, according to the terminal parameter information and the search space monitoring periodicity of the terminal, an index of a time-domain resource of the search space corresponding to the terminal;
    wherein, the determining, according to the terminal parameter information and the search space monitoring periodicity of the terminal, the index of the time-domain resource of the search space corresponding to the terminal, comprises:
    determining, according to the terminal parameter information and the search space monitoring periodicity of the terminal, the index of the time-domain resource of the search space corresponding to the terminal by using a first formula;
    wherein the first formula is: mod (T_index,N)=mod(A, N);
    mod represents a modulus operator, T_index represents the index of the time-domain resource of the search space, N represents the search space monitoring periodicity of the terminal, N is a positive integer greater than or equal to 1, and A represents the terminal parameter information.

2. The method for determining the time-domain position of the search space according to claim 1, wherein, the index of the time-domain resource of the search space comprises at least one of: an index of slot, an index of subframe, or an index of radio frame.

3. The method for determining the time-domain position of the search space according to claim 1, wherein, the index of the time-domain resource of the search space is a relative time serial number or an absolute time serial number.

4. The method for determining the time-domain position of the search space according to claim 3, wherein, the relative time serial number is a serial number within a preset time period.

5. The method for determining the time-domain position of the search space according to claim 3, wherein, the absolute time serial number is a serial number within a system.

6. The method for determining the time-domain position of the search space according to claim 1, wherein, a numbering manner of the terminal parameter information is consistent with a numbering manner of the index of the time-domain resource of the search space.

7. The method for determining the time-domain position of the search space according to claim 1, wherein, before determining the time-domain position of the search space corresponding to the terminal, according to the terminal parameter information and the search space monitoring periodicity of the terminal, the method further comprises:
    determining the search space monitoring periodicity of the terminal according to a preset parameter of the terminal;
    wherein the preset parameter of the terminal comprises at least one of: a type of the terminal, a type of a service supported by the terminal, or a terminal capability of the terminal.

8. The method for determining the time-domain position of the search space according to claim 1, wherein, the search space monitoring periodicity of the terminal is configured through a network or predefined through a protocol.

9. A communication device, comprising: a memory, a processor, and a computer program stored on the memory and executable on the processor, wherein when executing the program, the processor is configured to implement following steps:
    determining a time-domain position of a search space corresponding to a terminal, according to terminal parameter information and a search space monitoring periodicity of the terminal;
    wherein the terminal parameter information comprises: a terminal identity identifier (UE ID) or a cell radio network temporary identifier (C-RNTI) corresponding to the terminal, and the search space monitoring periodicity of the terminal is a predetermined value;
    wherein, the processor is specifically configured to:
    determine, according to the terminal parameter information and the search space monitoring periodicity of the terminal, an index of a time-domain resource of the search space corresponding to the terminal;
    wherein, the processor is specifically configured to:
    determine, according to the terminal parameter information and the search space monitoring periodicity of the terminal, the index of the time-domain resource of the search space corresponding to the terminal by using a first formula;
    wherein the first formula is: mod (T_index,N)=mod(A, N);
    mod represents a modulus operator, T_index represents the index of the time-domain resource of the search space, N represents the search space monitoring periodicity of the terminal, N is a positive integer greater than or equal to 1, and A represents the terminal parameter information.

10. The communication device according to claim 9, wherein, the index of the time-domain resource of the search space comprises at least one of: an index of slot, an index of subframe, or an index of radio frame.

11. The communication device according to claim 9, wherein, the index of the time-domain resource of the search space is a relative time serial number or an absolute time serial number.

12. The communication device according to claim 11, wherein, the relative time serial number is a serial number within a preset time period; or
wherein, the absolute time serial number is a serial number within a system.

13. The communication device according to claim 9, wherein, a numbering manner of the terminal parameter information is consistent with a numbering manner of the index of the time-domain resource of the search space.

14. The communication device according to claim 9, wherein, the processor is further configured to:
determine the search space monitoring periodicity of the terminal according to a preset parameter of the terminal, before determining the time-domain position of the search space corresponding to the terminal, according to the terminal parameter information and the search space monitoring periodicity of the terminal;
wherein the preset parameter of the terminal comprises at least one of: a type of the terminal, a type of a service supported by the terminal, or a terminal capability of the terminal.

15. The communication device according to claim 9, wherein, the search space monitoring periodicity of the terminal is configured through a network or predefined through a protocol.

16. A non-transitory computer readable storage medium, wherein a computer program is stored in the computer readable storage medium, and the program, when executed, causes a processor to implement following steps:
determining the time-domain position of the search space corresponding to a terminal, according to terminal parameter information and a search space monitoring periodicity of the terminal;
wherein the terminal parameter information comprises: a terminal identity identifier (UE ID) or a cell radio network temporary identifier (C-RNTI) corresponding to the terminal, and the search space monitoring periodicity of the terminal is a predetermined value;
wherein, the determining the time-domain position of the search space corresponding to the terminal, according to the terminal parameter information and the search space monitoring periodicity of the terminal comprises:
determining, according to the terminal parameter information and the search space monitoring periodicity of the terminal, an index of a time-domain resource of the search space corresponding to the terminal;
wherein, the determining, according to the terminal parameter information and the search space monitoring periodicity of the terminal, the index of the time-domain resource of the search space corresponding to the terminal, comprises:
determining, according to the terminal parameter information and the search space monitoring periodicity of the terminal, the index of the time-domain resource of the search space corresponding to the terminal by using a first formula;
wherein the first formula is: mod (T_index,N)=mod(A, N);
mod represents a modulus operator, T_index represents the index of the time-domain resource of the search space, N represents the search space monitoring periodicity of the terminal, N is a positive integer greater than or equal to 1, and A represents the terminal parameter information.

* * * * *